Oct. 12, 1943.                L. G. PLANT                2,331,724
                    LOCOMOTIVE COALING APPARATUS
              Filed Nov. 15, 1940           3 Sheets-Sheet 1
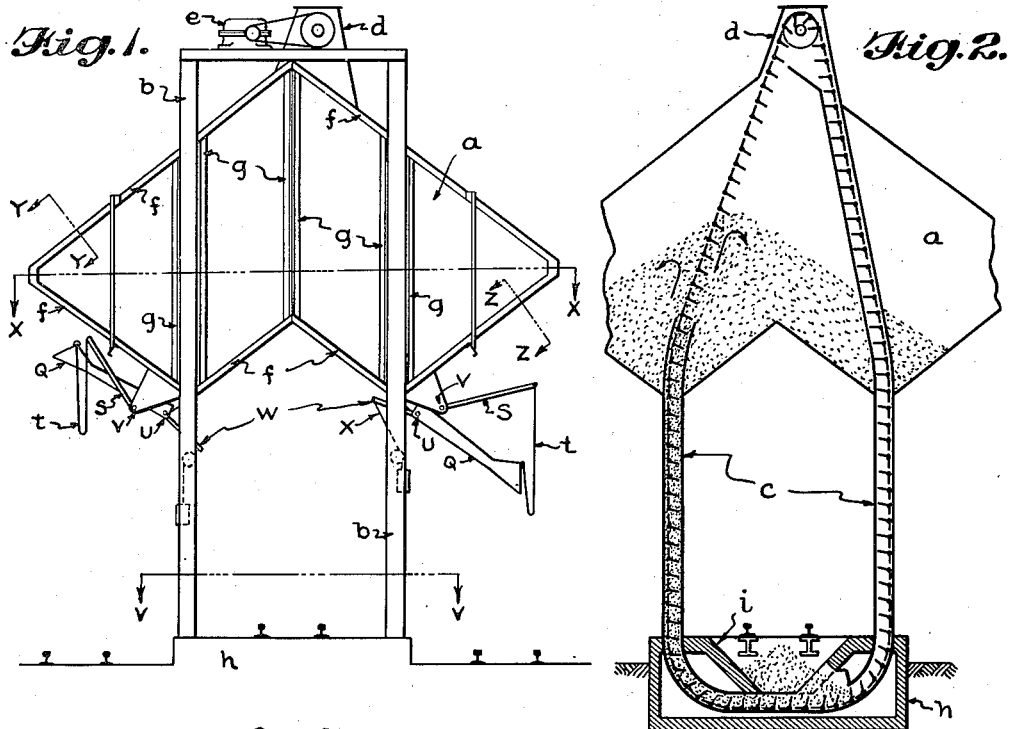
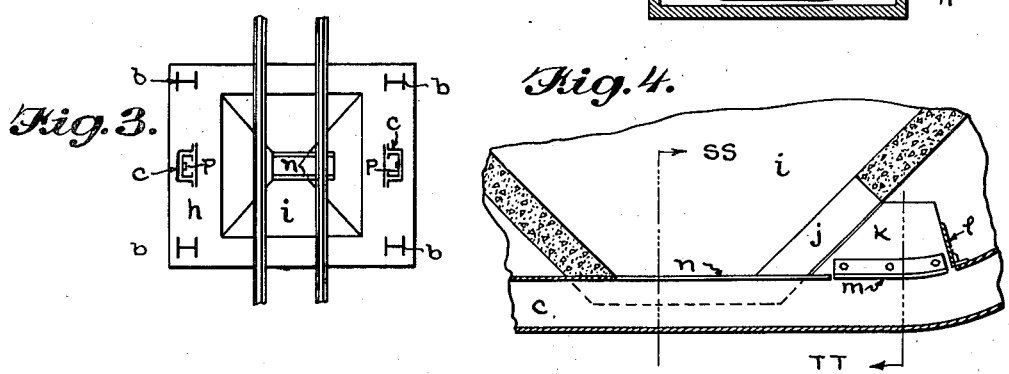
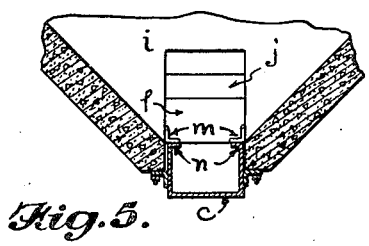
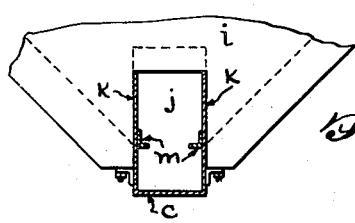
INVENTOR.
L. G. PLANT,
BY J. Stanley Churchill
ATTORNEY.

Oct. 12, 1943.   L. G. PLANT   2,331,724
LOCOMOTIVE COALING APPARATUS
Filed Nov. 15, 1940   3 Sheets-Sheet 2

INVENTOR.
L. G. PLANT,
BY J. Stanley Churchill,
ATTORNEY.

WITNESS
William R. McCochran, Jr.

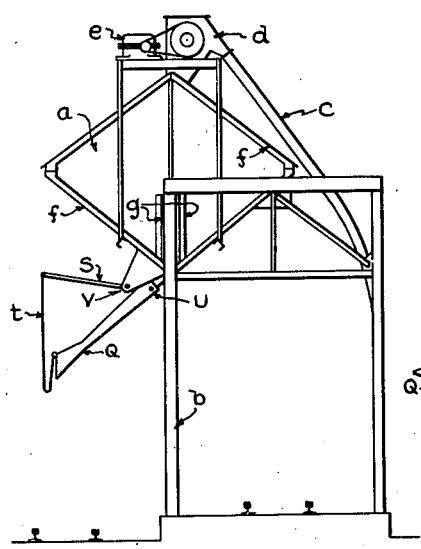
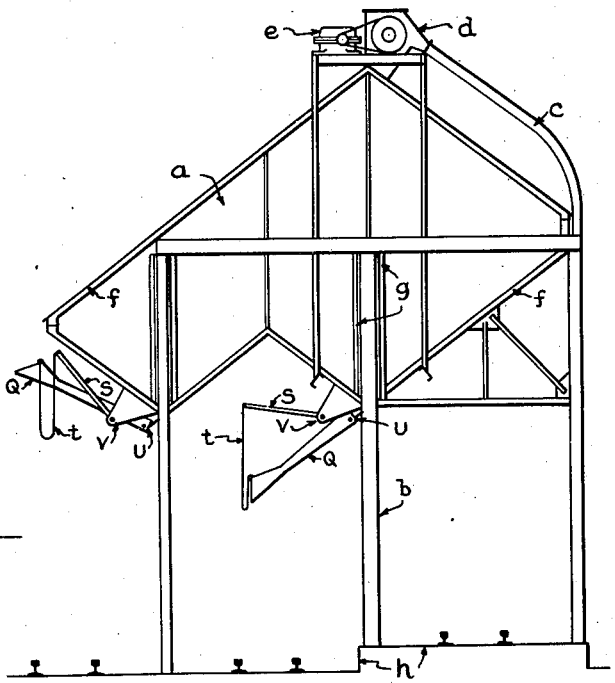
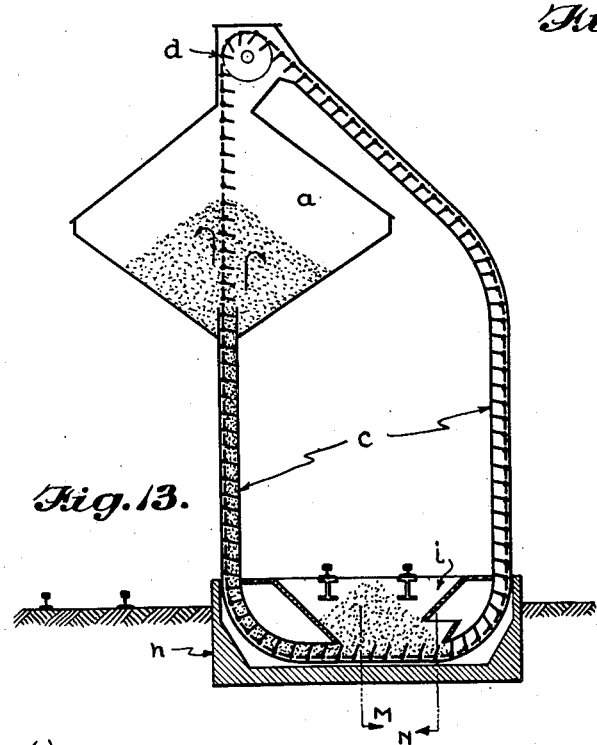
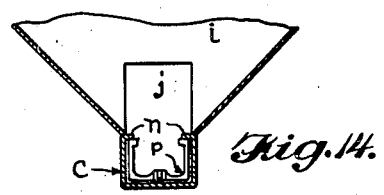

Patented Oct. 12, 1943

2,331,724

UNITED STATES PATENT OFFICE 2,331,724

LOCOMOTIVE COALING APPARATUS

Leland G. Plant, Washington, D. C.

Application November 15, 1940, Serial No. 365,841

8 Claims. (Cl. 214—17)

This invention relates to a locomotive coaling apparatus.

The invention has for an object to provide a locomotive coaling station of novel and improved construction by which economies in the fabrication of the struction and in the maintenance and operation of the same may be effected; and by which the coal may be handled in a more simple and efficient manner than heretofore practiced in prior locomotive coaling structures of which I am aware.

With this general object in view and such others as may hereinafter appear, the invention consists in the locomotive coaling apparatus and in the various structures, arrangements and combinations of parts hereinafter described and particularly defined in the claims at the end of this specification.

Figure 7:
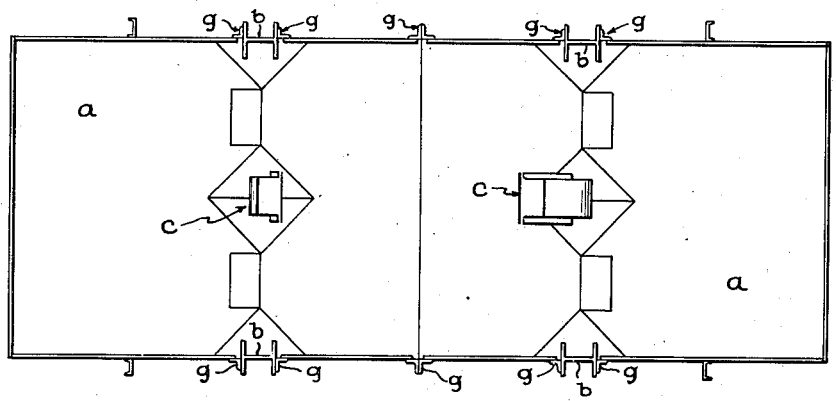
Figure 8:
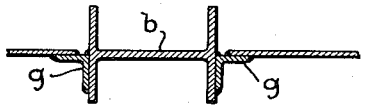
Figure 9:
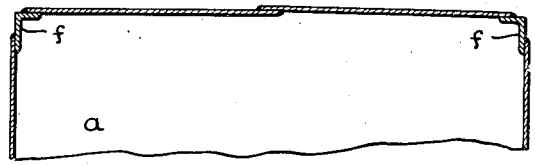
Figure 10:
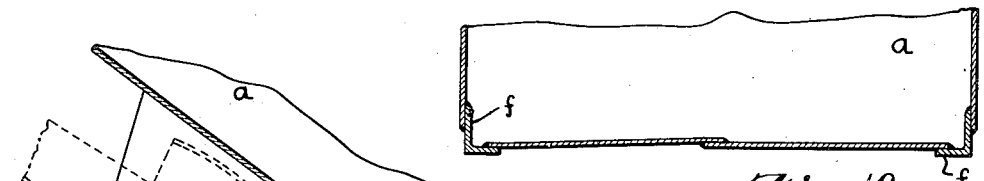
Figure 11:
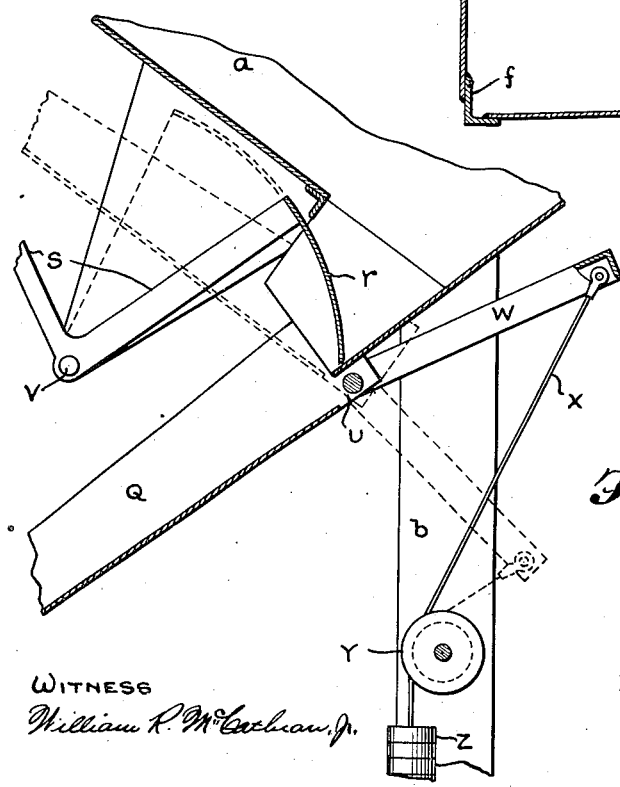

In the drawings illustrating the preferred embodiments of the invention, Fig. 1 is a side elevation of locomotive coaling structure adapted to deliver coal to locomotives upon either side of the coaling apparatus; Fig. 2 is a longitudinal cross-section of the apparatus illustrated in Fig. 1, showing a coal receiving hopper and elevating mechanism for delivering the coal from the hopper to the elevated storage bins; Fig. 3 is a sectional plan view on the line V—V of Fig. 1 showing the foundation structure and the coal receiving hopper formed therein; Fig. 4 is an enlarged cross-section of a portion of the coal receiving hopper showing detail of the conveyer trough with relation to the hopper structure; Fig. 5 is a cross-sectional detail on the line S—S of Fig. 4; Fig. 6 is a cross-sectional detail on the line T—T of Fig. 4; Fig. 7 is a transverse section through the storage bin taken on the line X—X of Fig. 1; Fig. 8 is an enlarged cross-sectional detail illustrating the manner of assembling the sides of the bin with the supporting columns; Fig. 9 and 10 are cross-sectional detail views taken on the lines Y—Y and Z—Z respectively and showing details of construction to be referred to; Fig. 11 is a detail side elevation, partly in cross-section, of an outlet gate mechanism embodied in the present apparatus; Fig. 12 is a side elevation of a modified form of the present coaling apparatus showing a structure adapted to deliver coal to a locomotive on one side only of the coaling apparatus; Fig. 13 is a longitudinal cross-section of the apparatus shown in Fig. 12; Figs. 14 and 15 are cross-sectional detail views taken on the lines M and N respectively of Fig. 13; and Fig. 16 is a side elevation of another modification of the present coaling apparatus showing a structure adapted to deliver coal to locomotives disposed upon two adjacent tracks.

In general, the present invention contemplates an improved construction of a locomotive coaling station having an overhead storage bin from which coal may be withdrawn by gravity and having provision for elevating the coal from a source of supply to said bin. In the illustrated embodiment of the invention the elevating mechanism may and preferably will comprise an endless loop type chain conveyer of the type illustrated and described in the patent to Sinden, No. 2,160,234, May 30, 1939, and in which the conveying element comprises the so-called "Redler" type conveyer now widely used in the conveying field.

The present invention enables the cost of construction, operation and maintenance of facilities for receiving, storing and delivering coal to locomotives to be reduced and advantages of the "Redler" type over other chain conveyers are made more fully available than heretofore in such service.

The present invention affords a structure adapted to welded assembly and use of low alloy, corrosion and abrasion resistant steels at less increase in fabricating cost than in other forms of coaling structures. The present invention also effects economies in foundation costs by a novel design of the coal receiving hopper in relation to the conveyer and by a new arrangement of the conveyer in relation to the elevated storage bin whereby the column footings supporting said bin and the coal receiving hopper are combined in an integral concrete unit more compact and of less excavation depth in relation to weight of bin supported and area of the receiving hopper than achieved by any practical development in the prior art.

Furthermore, the present invention effects economies in fabricating costs by the unique use in locomotive coaling structures of triangular shaped segments of the elevated bin in which the roof and floor slopes are pitched to the flow angle of coal. Such segments project from the face of the columns by which they supported and overhang the tracks below. This design effects economies in the amount of steel required for a given bin capacity and does not require the use of any curved plate surfaces which must be rolled in the course of fabrication. The resulting saving in cost is increased where alloy steels or wrought iron plates are used. The assembly of flat plates in this construction by means of welding is accomplished without distortion of the plate surfaces by the combination of structural shapes and plates disclosed herein.

An improvement in structural efficiency is also effected through this combination of structural shapes and steel plates wherein the standard steel shapes used for stiffening members and the beams used for column supports serve also as panels in the wall surface of the bin.

The efficiency of the present construction for a coaling apparatus of the type illustrated is augmented by those features of the invention which combine to reduce the overall height of the structure in relation to its capacity. In a coaling structure which must be of sufficient elevation to afford the required track clearance and discharge its coal contents by gravity to a locomotive tender, the overhanging bin construction of triangular shape in combination with a unique outlet gate and pivoted spout arrangement herein disclosed, enables the bin for these coaling structures to be placed at less height in relation to the track elevation than has heretofore been practiced.

As will be disclosed in the following description of this invention, its various features combine to produce a more efficient locomotive coaling structure, available at less cost in relation to its capacity, than attained in earlier constructions.

In the drawings which illustrate the preferred embodiments of the invention, the following letters are used to designate the different parts of the structure:

*a*—The overhead storage and delivery bin of a locomotive coaling structure.
  *b*—The main column supports for bin *a*.
  *c*—A continuous conveyer loop of the chain type, such as "Redler," including the links and casing.
  *d*—Drive sprocket for conveyer *c*.
  *e*—Driving mechanism for conveyer *c*.
  *f*—Corner angle members of the bin structure *a*.
  *g*—Side supporting angles for the bin structure *a*.
  *h*—Foundations for bin *a* and integral supporting structure for the coal receiving hopper.
  *i*—Coal receiving hopper of concrete cast integrally with foundations, or steel supported in the foundation *h*.
  *j*—Access opening into the coal receiving hopper.
  *k*—Plates on either side of the access opening *j*, extending from underside of the coal receiving hopper to casing of conveyer *c*.
  *l*—Removable plate adapted in connection with plates *k*, to complete enclosure around the sides of the access opening *j*.
  *m*—Removable rail for chain track at sides of opening in top casing of conveyer *c*.
  *n*—Projections for chain track at sides of opening in top of casing for conveyer *c*, at foot of slopes in the coal receiving hopper.
  *p*—Link in conveyer chain *c*, cross-section view.
  *q*—Spout, pivoted and counterbalanced, for chuting coal from storage bin *a*, by gravity to locomotive tenders.
  *r*—Gate, radial overcut type for controlling flow of coal over spout *q*.
  *s*—Lever arm for actuating gate *r*.
  *t*—Cord for pulling down spout (against counterweight) into position for chuting coal to locomotives, and for operating lever arm *s*.
  *u*—Pivot for spout *q*.
  *v*—Pivot for gate *r*.
  *w*—Counterweight lever arm.
  *x*—Counterweight cord.
  *y*—Counterweight pulley.
  *z*—Counterweight for spout *q*.

The principal controlling factors in the cost of building a locomotive coaling structure of a given capacity, are: depth of foundation and height of superstructure. Depth of foundation is determined by: the required size of the track hopper into which the coal is received from supply cars; the pitch of the hopper slopes; and the type of mechanism employed for delivering the coal into an elevator, as well as the type of elevating mechanism itself.

In the details of design disclosed by Figs. 4, 5, 6, 14 and 15, it will be noted that the hopper slopes pitch directly from opposite sides down to edges of the trough through which the conveyer *c* travels. In the illustrated embodiment of the invention, I require no space to be provided between the foot of the hopper slopes and the path of the chain conveyer, either for mechanism to feed the coal from the hopper into the conveyer, or for side access doors at foot of the hopper slopes, as heretofore considered necessary with conveyers of the chain type herein shown. A substantial reduction in the depth of the foundation in an installation of a conveyer such as shown in relation to the hopper, is possible in the present invention because of the provision, unique for such conveyers, of a permanent access *j*, in the hopper slopes above the conveyer *c*, as illustrated in these drawings and more fully described in the following.

By reference to accompanying illustrations, particularly to Figs. 2, 4 and 13, it will be observed that I have placed the storage bin *a*, in such relation to the coal receiving hopper *i*, that both are supported upon the same foundation structure *h*, and in this arrangement I am able to loop a continuous conveyer chain *c*, from one side of the hopper vertically up into the storage bin *a*, through said bin to a chain sprocket *d*, forming part of a conveyer driving mechanism *e*, located on the roof of said bin, thence down to the other side of said hopper and complete the loop underneath the coal unloading track.

The conveyer *c*, as indicated on the drawings, is completely encased from the hopper pit *h*, up to the storage bin *a*. The practice in conveyers of this type is to attach one face of this casing by bolts so that this face can be taken off if necessary to reach any section of the chain and its channel. Inside the bin *a*, the casing for conveyer *c*, of the type indicated, is ordinarily omitted around the up-going track of the chain, allowing coal elevated from the receiving hopper to spill into the bin at whatever level it is being filled. If the down track of the conveyer chain is carried through the bin *a*, as in the arrangement of Fig. 1, said down track is encased as indicated.

Preference as to the several forms of storage bins shown in Figs. 1, 12 and 16, is indicated by arrangement of the tracks on which locomotives are required to be coaled. For each particular arrangement, however, the form of bin structure as developed in relation to the coal receiving hopper of this invention, enables a lower elevation of the overall height of the structure and a lesser length of the conveyer chain to accomplish a given elevated storage capacity than in prior constructions adapted to like locomotive track positions.

In earlier installations where the conveyer chain has been looped underneath the hopper, the conveyer trough was placed at a sufficient depth below the coal receiving hopper to insert a box chamber in the side of which a door could be hinged and opened in such position that contents of the hopper would not flow out. The purpose of this opening was either to dislodge lumpy coal that had arched over the passage into the conveyer trough or to remove foreign matter that may have fallen into the hopper. Improved access means provided by my invention include a fixed opening $j$, in the hopper slope directly above the trough of conveyer $c$, with plates $k$ and $l$ surrounding the sides of said opening so that coal flowing down through this opening is directed into the conveyer trough and assumes an angle of repose before spilling over the sides of said plates. This provides a permanently accessible opening into the hopper at the level where coal is fed into the conveyer trough. The accessibility of this opening may be augmented by removing plate $l$ when necessary. Although shown only in that side of the hopper at which the conveyer chain is moving toward the hopper, access openings of the same type may be constructed on the opposite side of the hopper as an additional means of access and to augment the area through which coal is fed from the hopper into the conveyer trough.

The continuous chain conveyer indicated in these drawings is the so-called "Redler" type, of recent invention, comprising a succession of interlocking links $p$. In order to hold these links in their track under the hopper where the top of the conveyer trough is open to receive coal, rails $n$ are provided in the form of projections from the top edges of said trough. Removable rails $m$, provided for the same purpose, may be bolted to the side plates $k$, to permit removal and replacement of individual links $p$, in the conveyer chain $c$.

To augment the saving in structural height accomplished by this invention under conditions where clearance requirements are exacting, I employ an arrangement of the spout $q$, and gate mechanism indicated on the several elevation drawings and detailed in Fig. 11, wherein the radial gate $r$, is pivoted at $v$, to brackets projecting from the underside of the overhead bin. These brackets project independently of the outlet chute to which the spout $q$ is pivoted at $u$. The gate $r$ is of the radial over-cut type most commonly employed in locomotive coaling structures. It is actuated by a lever arm $s$, from which depends the pull cord $t$. In the spout and gate mechanism shown, the pivot points $u$ and $v$, may be located at approximately the same elevation above the track level and the overhead storage bin $a$ may be supported at an elevation just sufficient to discharge its contents by gravity over the inclined spout $q$, to a locomotive tender. In prior coaling structures, the practice has been to extend the outlet chute projecting at an inclination from the underside of the storage bin far enough to support pivots for both the hinged spout and the radial gate. In such prior arrangement the pivot point for the spout had to be disposed at a substantial distance below the level of the pivot point for the gate. As it is customary to position the gate pivot about three feet from the gate, this prior arrangement required the spout pivot to be at least that distance from the underside of the bin, and the latter had to be elevated sufficiently above this pivot point to produce the slope required in the chute. In my arrangement, the spout pivot point can be located much closer to the underside of the bin without affecting the position of the gate pivot. In States where vertical clearances over the tracks extend full width to the side of the coaling structure, the elevation of the spout pivot determines the height of the bin structure which in my construction, under the conditions described, may be lowered.

In the preferred embodiment of the invention, in order to facilitate the application of a swinging spout $q$, having the advantages cited, the spout is provided with counterweights that will automatically return the spout to a raised position when not in use, and as herein shown, I employ lever arms $w$, at the extremity of which appropriate weight may be applied, either directly mounted on the arms or in the manner illustrated by Fig. 11, where the counterweight $z$ is suspended from a cord $x$, running over a pulley $y$. The feature of this arrangement is that the spout $q$ is securely counterweighted against wind pressure etc. when not in use but lightly counterweighted in the down position when chuting coal to locomotives so that no effort is required to hold it in that position. This is accomplished by locating the pulley $y$, so that the lever arm acting on the pivot $u$, at right angles to the cord $x$, (above the pulley $y$) is greatest when the spout $q$ is in its raised position and decreases in effective length as said spout is lowered.

To complete the efficiency of this coaling structure in its combination with the hopper arrangement and chain loop conveyer above described, I employ an overhead bin construction unique in this field and especially adapted to an all-welded assembly. Outlines characteristic of these structures are shown in Figs. 1, 12 and 16. Fig. 7 shows a cross-section that is typical of the combination of structural shapes and steel plates employed in these structures.

Main columns $b$, for supporting the bin structure $a$, are preferably of H beam section and so far as practical, overhead storage capacity is provided in triangular shaped bin segments, projecting outwardly from the face of these supporting columns $b$. In this construction, as shown by Fig. 8, the web of a supporting column $b$ serves as a panel of the bin side wall. Attachment of adjoining side wall plates to this column is effected through angle members $g$, which serve also to stiffen and reinforce column $b$. The use of supporting column members for a portion of the side walls is designed in part to economize in the use of plates required for enclosing the bin and in effect, produces a more integrated structure than when these supporting members are simply attached to outside surfaces of the wall structure.

A further combination of standard steel shapes with steel plates in which the shapes become an integrated part of the bin surfaces is developed by the use of angles $f$, in the sloping corners between the sides and roof as shown in Fig. 9, and between the sides and floor as shown in Fig. 10. The characteristic design of this bin structure enables it to be constructed entirely of flat plates in place of rolled plates required for the cylindrical and conical surfaces heretofore most commonly used and reduces the necessity for stiffening members in comparison with the requirements of earlier constructions having flat wall surfaces. The saving in fabricating cost by using flat plates is greatly accentuated if corrosion and abrasion resistant steels of the low alloy class, now coming into use for coaling structures, are employed in this construction.

For the purposes of welded fabrication which applicant has been the first to use for complete assembly in the actual construction of locomotive coaling structures, the combination of standard shapes and plates herein disclosed is a new and important development. It has been found that if plates used for the roof, floor and side panels of a bin structure with flat wall panels, are butted against heavier shapes such as the standard H beam sections and welded to said shapes along their abutting edge, the heat of this weld localized on a line of rigid attachment to the heavy member, produces such distortions in the plate that its surface remote from the weld is bowed, usually in an undulating contour along its outer edges. If opposite edges of the same plate are both butted against and welded to heavy structural shapes, the intermediate surface is often badly distorted and very severe stresses are lodged in the assembled structure. Where a plate is thus welded into the corner formed by two intersecting structural beams, it is not uncommon for cracks to develop in the structure because of the strain to which it is subjected by having this plate welded to both beams in this position.

In the construction which I have developed, plates are lapped over the heavier structural shapes to which they are welded. The process is to first fabricate a frame of structural angles outlining the side panel in which a plate is to be used. This plate is then laid upon the flat surfaces of this frame, allowing room for this overlap to expand or contract along the line of fused contact as the weld progresses. In the structure of Figs. 7 and 8, the angle $g$ is part of a frame of structural shapes first assembled as described, then welded to plate surfaces lapped over it as shown. In Figs. 9 and 10, the angles $f$, on which the side wall plates are shown to be lap welded, are likewise portions of the framework above described. To these, the roof and floor plates can be lap welded as shown. The roof sheets are preferably lapped over the outside of angle $f$, and the floor plates are preferably lapped over the inside face of angle $f$.

In bins constructed for the storage of coal in which moisture and sulphur are commonly present, the desirability of having its seams sealed with a continuous welded bead is obvious. A long existing objection to use of steel for such structures has been the effect of the corrosion concentrated around rivet heads and along seams into which moisture can seep. The application of welding to other forms of structures has long been practiced but notwithstanding its obvious advantages over riveted construction, particularly for the storage of coal, no locomotive coaling structures have been built prior to this invention in which riveted assembly has been entirely or even principally supplanted by welding.

Applicant is the first to devise and employ practical means for assembling locomotive coaling structures entirely by welding. This circumstance supports the claim that it is the development of structural details herein disclosed that has afforded the key to a successful use in coaling structures of welding to an advantage previously limited to other fields.

The "Redler" type of chain conveyer is already widely used for elevating coal in many services but up to developments resulting from this invention, no successful application of this type of conveyer had been accomplished in locomotive coaling structures notwithstanding its superior suitability for such use. The application of "Redler" conveyers to conventionally designed coaling structures for locomotives has previously been proposed but has not succeeded because of the construction costs involved. It is the special economy of coaling structures herein described that has enabled them to be combined with chain conveyers of the "Redler" type in a construction made available to locomotive service under competitive sales conditions.

While the preferred embodiments of the invention have been herein illustrated and described, it will be understood that the invention may be embodied in other forms within the scope of the following claims.

Having thus described the invention, what is claimed is:

1. A locomotive coaling structure comprising, elevating means for delivering coal to a storage bin including a casing and a conveying element traversable through said casing, a coal receiving inlet in said casing, a hopper having sloping sides arranged to guide the coal to said inlet, said hopper having an opening in the bottom thereof extending up at least one of said sloping sides above the casing to permit the material to flow out of said sloping side in a direction opposed to the direction of travel of said conveying element until it assumes its angle of repose, said casing inlet being in communication with the bottom of the hopper and extending below the material flowing out of said sloping side whereby to provide an access opening into the hopper at the level where coal is fed into the conveyer casing.

2. A locomotive coaling structure, comprising, an overhead storage bin from which coal may be discharged by gravity, elevating means for delivering coal to said bin including a drive sprocket at the upper end of said bin and a continuous chain conveyor loop passing over said drive sprocket, a first conduit cooperating with said conveyor chain to form the carrying run of the conveyor and a second conduit cooperating with said conveyor chain to form the return run of the conveyor, said first conduit having a coal receiving inlet for admitting coal thereinto at a point below said storage bin, said chain conveyor loop being arranged to pass through said bin and to encompass a portion of said bin, said first conduit having a discharge end terminating within said bin to permit the coal discharged therefrom to form a pile in said bin through which the conveying element is drawn.

3. A locomotive coaling structure as defined in claim 2, in which a foundation structure is provided below the storage bin and contains a coal receiving hopper provided with sloping walls arranged to guide the coal into the inlet of the carrying run of the conveyor, and in which the overhead storage bin is supported by columns resting upon said foundation structure.

4. A locomotive coaling structure as defined in claim 1, in which side plates extend upwardly from the conveyor casing and are arranged to guide the coal from said side wall opening into said casing inlet.

5. A locomotive coaling structure comprising, an elevated storage bin having an outlet at its lowermost point from which coal may be withdrawn by gravity, a hinged spout pivotally mounted upon the lip of a chute from said outlet, a pivotally mounted radial overcut gate supported upon brackets projecting from the underside of said bin, the pivots for said gate and chute being disposed in substantially the same horizontal plane, and means for counterweighting said spout including a lever arm pivoted opposite said spout, a counterweight cord attached to said lever arm and a pulley over which said cord passes, said counterweighting means being constructed and arranged in a manner such that the counterweight force is greatest when the spout is in its raised position, and decreases in effectiveness as the spout is moved to its lowered position.

6. In a locomotive coaling structure, in combination, an elevated storage bin from which coal may be withdrawn by gravity, comprising vertical structural beams upon which said bin is supported, a frame work for said bin comprising angle shaped structural members attached to opposite sides of said vertical beams, side wall panels comprising flat plates attached to said frame work, floor and roof panels likewise comprising flat plates attached to said frame work, said flat side wall, floor and roof panels being joined to said frame work by overlapping the plates upon the flat surfaces of said angle shaped members, said side wall panels together with the webs of said vertical beams forming a unitary self-supporting wall structure adapted to having all its seams welded.

7. A locomotive coaling structure as defined in claim 2 in which the second conduit, which cooperates with the chain conveyor to form the return run of the conveyor, is arranged exteriorly of the storage bin.

8. A locomotive coaling structure as defined in claim 2, in which the second conduit, which cooperates with the conveyor chain to form the return run of the conveyor, is partially disposed within the storage bin.

LELAND G. PLANT.